(12) United States Patent
Guenthner et al.

(10) Patent No.: US 7,689,403 B2
(45) Date of Patent: Mar. 30, 2010

(54) INSTRUCTIONS PROVIDING NEW FUNCTIONALITY FOR UTILIZATION BY A TARGET SYSTEM PROGRAM OF HOST SYSTEM CONTAINER WORDS DURING COMPUTER SYSTEM EMULATION WITH HOST WORD SIZE LARGER THAN THAT OF THE EMULATED MACHINE

(75) Inventors: Russell W. Guenthner, Glendale, AZ (US); Sidney L Andress, Glendale, AZ (US); John Heath, Glendale, AZ (US)

(73) Assignee: Bull HN

( * ) Notice: Subject to any disclaimer, the term of this patent is extended or adjusted under 35 U.S.C. 154(b) by 233 days.

(21) Appl. No.: 12/148,205

(22) Filed: Apr. 17, 2008

(65) Prior Publication Data

US 2008/0208562 A1 Aug. 28, 2008

Related U.S. Application Data

(63) Continuation of application No. 11/006,414, filed on Dec. 7, 2004, now Pat. No. 7,406,406.

(51) Int. Cl.
*G06F 9/455* (2006.01)
(52) U.S. Cl. .......................................... 703/27; 703/26
(58) Field of Classification Search ................. 703/26, 703/27; 712/226, 227; 717/138; 711/156
See application file for complete search history.

(56) References Cited

U.S. PATENT DOCUMENTS

| | | | | |
|---|---|---|---|---|
| 4,370,709 A | * | 1/1983 | Fosdick | 703/26 |
| 4,876,639 A | * | 10/1989 | Mensch, Jr. | 703/27 |
| 5,345,580 A | * | 9/1994 | Tamaru et al. | 703/28 |
| 5,420,992 A | * | 5/1995 | Killian et al. | 703/27 |
| 5,574,927 A | * | 11/1996 | Scantlin | 712/41 |
| 5,678,032 A | * | 10/1997 | Woods et al. | 703/26 |
| 5,740,461 A | * | 4/1998 | Jaggar | 712/41 |
| 5,819,063 A | * | 10/1998 | Dahl et al. | 703/27 |
| 5,832,292 A | * | 11/1998 | Nguyen et al. | 712/23 |
| 5,889,983 A | * | 3/1999 | Mittal et al. | 712/223 |
| 5,896,522 A | * | 4/1999 | Ward et al. | 703/23 |
| 6,360,194 B1 | * | 3/2002 | Egolf | 703/26 |
| 6,728,846 B2 | * | 4/2004 | Noyes | 711/156 |
| 6,922,666 B2 | * | 7/2005 | Noyes | 703/26 |
| 7,314,491 B2 | * | 1/2008 | Guenthner et al. | 703/26 |

* cited by examiner

*Primary Examiner*—Paul L Rodriguez
*Assistant Examiner*—Luke Osborne
(74) *Attorney, Agent, or Firm*—Russell W. Guenthner

(57) ABSTRACT

Two unique instructions for the instruction set of a target 36-bit machine which is emulated on a host 64-bit machine are provided in order to achieve visibility, to an emulated application program, of a "containing" word stored in the memory of the host machine. A "LOAD64" instruction loads the emulator memory location representing an emulated "Q" (supplementary accumulator) register with the "normal" 36-bits of the containing word. At the same time, the "upper" 28 bits of the 64-bit containing word is copied into the emulator memory location representing an emulated "A" (accumulator) register. Thus, the emulated 36-bit machine "sees" and can examine the 64-bit word in its entirety. A "Store64" instruction stores the emulated "Q" register contents into the lower 36-bits of the 64-bit containing word, and at the same time stores the lower 28 bits of the emulated "A" register contents into the upper 28 bits of the 64-bit containing word.

3 Claims, 5 Drawing Sheets

INSTRUCTIONS PROVIDING NEW FUNCTIONALITY FOR UTILIZATION BY A TARGET SYSTEM PROGRAM OF HOST SYSTEM CONTAINER WORDS DURING COMPUTER SYSTEM EMULATION WITH HOST WORD SIZE LARGER THAN THAT OF THE EMULATED MACHINE

This application is a continuation and claims the benefit of the patent application titled:

"INSTRUCTIONS TO LOAD AND STORE CONTAINING WORDS IN A COMPUTER SYSTEM EMULATOR WITH HOST WORD SIZE LARGER THAN THAT OF THE EMULATED MACHINE"

invented by Russell W. Guenthner, Sidney L. Andress, and John E. Heath bearing application Ser. No. 11/006,414, and filed on Dec. 7, 2004 now Allowed U.S. Pat. No. 7,406,406, the disclosure of which is incorporated here in its entirety by reference.

FIELD OF THE INVENTION

This invention relates to the art of computer emulation and, more particularly, to a computer system emulator in which the word size of the machine on which the emulation is being performed is larger than the word size of the emulated machine.

BACKGROUND OF THE INVENTION

Users of obsolete mainframe computers running a proprietary operating system may have a very large investment in proprietary application software and, further, may be comfortable with using the application software because it has been developed and improved over a period of years, even decades, to achieve a very high degree of reliability and efficiency.

As manufacturers of very fast and powerful commodity processors continue to improve the capabilities of their products, it has become practical to emulate the proprietary operating systems of powerful older computers such that the manufacturers of the older computers can provide new systems which allow the users to continue to use their highly-regarded proprietary software by emulating the older computer.

Accordingly, computer system manufacturers are developing such emulator systems for the users of their older systems, and the emulation process used by a given system manufacturer is itself subject to ongoing refinement and increases in efficiency and reliability.

Some historic computer systems now being emulated by commodity processors have non-conventional word lengths. Most, perhaps all, commodity processors have word lengths which are a power of two, and, at the state of the art, 64-bit word lengths are widely used. However, some historic computer systems now being emulated by commodity processors have non-conventional word lengths. An example is the Bull HN Information Systems (descended from General Electric Computer Department and Honeywell Information Systems) GCOS-8 operating system which employs a 36-bit word. The historic reason for the adoption of this word length was to permit data storage of four eight-bit characters per word, each character also being provided with a ninth, parity, bit to improve error-checking and fault tolerant capabilities and also to provide more precision than that provided by competing systems employing shorter word lengths such as 32 bits.

In one specific state-of-the-art example, a 64-bit Itanium Intel processor is used to emulate the Bull DPS 9000 36-bit memory space and the GCOS 8 instruction set of the DPS 9000. Within the memory space of the emulator, the 36-bit word of the DPS 9000 is stored right justified (least significant bits) in the least significant 36 bits of the "host" (Itanium) 64-bit word. The upper 28 bits of the 64-bit word are typically zero for "legacy" code. Sometimes, certain specific bits in the upper 28 bits of the containing word are used as flags or for other temporary purposes, but in normal operation these bits are usually zero and in any case are always viewed by older programs in the "emulated" view of the world as being non-existent. That is, only the emulation program itself uses these bits.

For some purposes, such as providing new or more direct communication with programs or services running in the 64-bit system, it would be advantageous to provide the emulated system with full access to the entire "containing" word, which in this case is the 64-bit containing word, for purposes of both loading or storing the 64-bit word from the viewpoint of the emulated software into visible space within the 36-bit environment. The capability of viewing and manipulating 64 bits can also be used to improve the machine architecture by such expedients as adding new opcodes with more functionality, increasing the address space, or other similar things which can utilize more bits in the instruction or data words.

The present invention is directed to achieving this end.

BRIEF SUMMARY OF THE INVENTION

It is therefore a broad object of this invention to improve the operation of an emulator system in which a host system using a first word length emulates an emulated system using a second word length which is shorter, but more than half, the first word length.

It is another broad object of this invention to improve the performance of such an emulated system.

It is a more particular object of this invention to provide two new instructions to the emulated system repertoire which improves communication between the host and emulated systems and which allows expanding the capabilities of the emulated system in terms of both function and performance.

Briefly, these and other objects of the invention are achieved in an illustrated embodiment by providing two new and unique instructions for the instruction set of a 36-bit machine which is emulated on a 64-bit machine. The first new instruction described by way of example in the illustrated embodiment is the "LOAD64" instruction which forms an address in the 36-bit address space pointing to a 36-bit word contained within a 64-bit host memory word. The LOAD64 instruction loads two emulated registers of the emulated machine, specifically the accumulator "A" and the supplementary accumulator "Q" registers. The emulated "A" and "Q" registers are both 36-bit registers, and together they are called the "AQ" register which is an emulated 72-bit register with the "A" being the most significant, and the "Q" being least significant. The LOAD64 instruction loads the emulator memory location representing the "Q" register with the "normal" 36-bits of the containing word pointed to by the normal address mechanism as for any typical 36-bit load instruction. At the same time, the "upper" 28 bits of the 64-bit containing word is copied into the emulator memory location representing the "A" register. Thus, the emulated 36-bit machine "sees" and can examine the 64-bit word in its entirety. A second new instruction, "Store64", described by way of example in the illustrated embodiment is also provided for purposes of "storing" into the 64-bit containing word from the "normal" 36-bit space of the emulated system. The STORE64 instruction stores the emulated "Q" register contents into the lower 36-bits of the 64-bit containing word, and at the same time stores the lower 28 bits of the emulated "A" register contents into the upper 28 bits of the 64-bit containing word. Address formation for pointing to the 64-bit word is exactly the same as performed for addressing the 36-bit word within the 64-bit containing word.

BRIEF DESCRIPTION OF THE SEVERAL VIEWS OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

Figure 1:
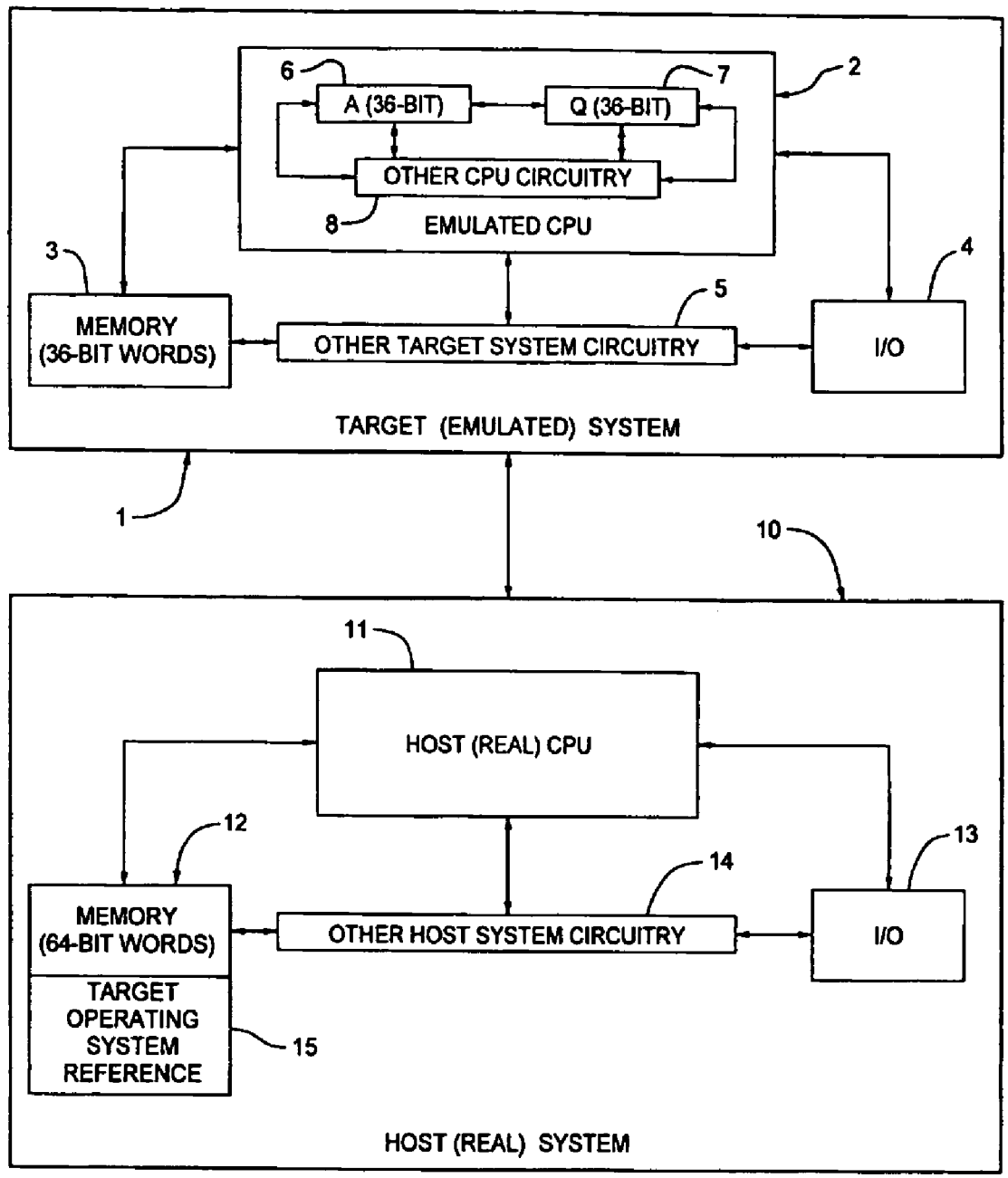
FIG. 1 is a block diagram showing a virtual target system emulated in a host system.

FIG. 1 illustrates an exemplary environment in which the invention finds application. More particularly, the operation of a target (emulated) system, which does not actually physically exist, is emulated by a host (real) system 10. The target system 1 includes an emulated central processing unit (CPU) 2, an emulated memory 3, emulated input/output (I/O) 4 and other emulated system circuitry 5. Of particular relevance to the present invention, the emulated CPU 2 incorporates concatenated accumulator "A" and supplementary accumulator "B" registers, 6, 7, respectively, as well as other CPU circuitry 8. The host (real) system 10 includes a host CPU 1, a host memory 12, host I/O 13 and other host system circuitry 14. The host memory 12 includes a dedicated target operating system reference space 15 in which the elements and components of the emulated system 1 are represented in one or more individual words each.

The target operating system reference space 15 also contains suitable information about the interconnection and interoperation among the various target system elements and components and a complete directory of the target system operating system commands which includes information on the steps the host system must take to "execute" each target system command in a program originally prepared to run on a physical machine using the target system operating system. It can be loosely be considered that, to the extent that the target system 1 can be said to "exist" at all, it is in the target operating system reference space 15 of the host system memory 12. Thus, an emulator program running on the host system 2 can replicate all the operations of an application program written in the target system operating system as if the application program were running on a physical target system.

In a current state-of-the-art example chosen to illustrate the invention, a 64-bit Itanium Intel processor is used to emulate the Bull DPS9000 36-bit memory space and the instruction set of the DPS9000 with its proprietary GCOS 8 operating system. Within the memory space of the emulator, the 36-bit word of the DPS9000 is stored right justified in the least significant 36 bits of the "host" (Itanium) 64-bit word during the emulation process. The upper 28 bits of the 64-bit word are typically zero; however, sometimes, certain specific bits in the "upper" 28 bits of the "containing" word are used as flags or for other temporary purposes. In any case, the upper 28 bits of the containing word are always viewed by the "emulated" view of the world as being non-existent. That is, only the emulation program itself uses these bits.

However, it has been determined that, for some purposes such as providing new or more direct communication with programs or services running in the 64-bit world and also for enhancement of the instruction set to actually utilize some or all of the 64 bits, it would be advantageous to provide the emulated system with full access to the entire "containing" word. Full access means, in this context, for purposes of both loading or storing, as well as the ability to operate on, the 64-bit word from the view of the emulated software into visible space within the 36-bit environment.

Figure 2A:
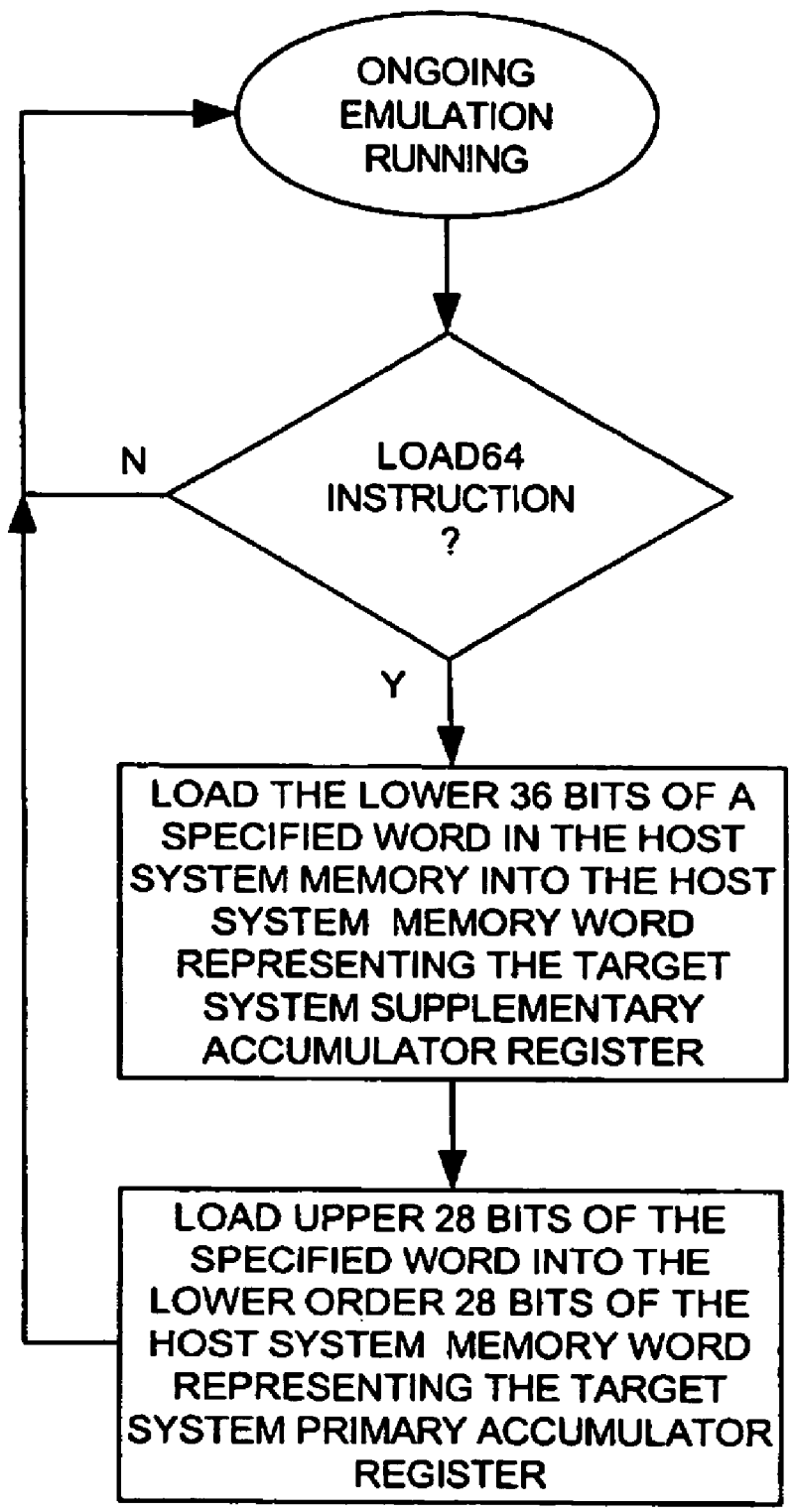
FIG. 2A is a flow chart showing the process of emulating a new write command provided in the operating system software of the target system as executed in the host system.
Figure 2B:
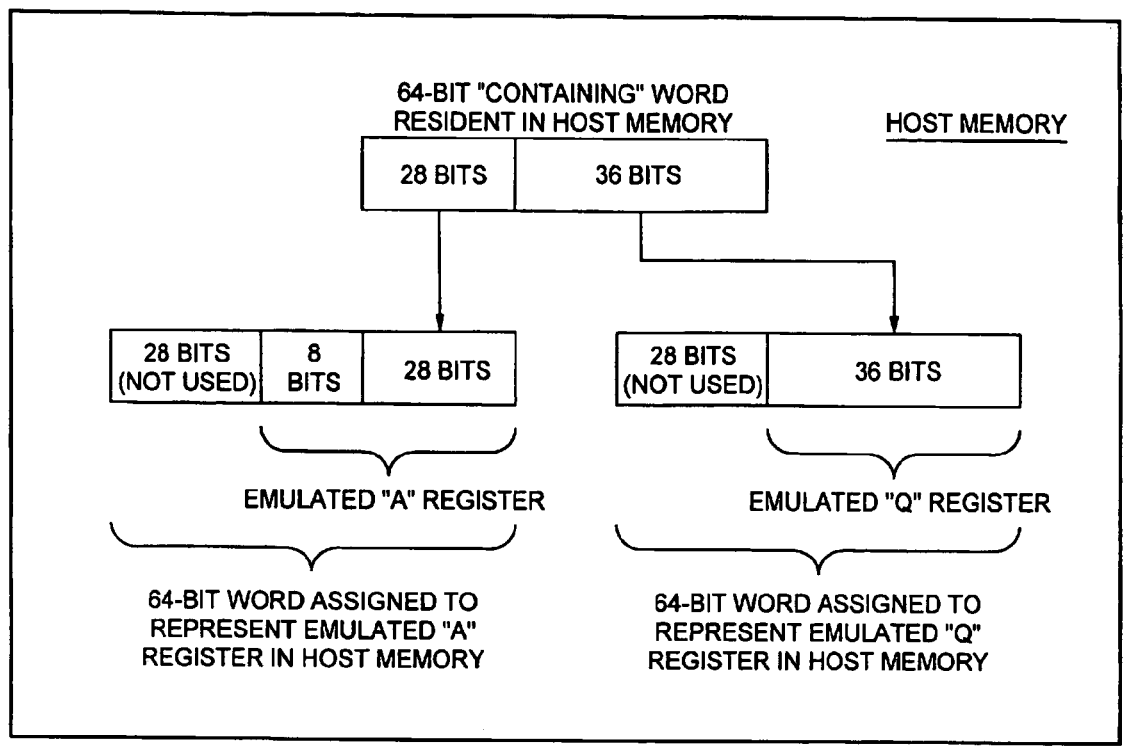
FIG. 2B is a block diagram showing the process flow of FIG. 2A as it takes place in the host system.

For these purposes, two new and unique instructions were created and added to the instruction set of the 36-bit machine, that is, the DPS9000/GCOS 8 instruction set. Referring now to both FIGS. 2A and 2B, the first new instruction is the "LOAD64" instruction which forms an address in the 36-bit address space pointing to a 36-bit word contained within a 64-bit host memory word. The LOAD64 instruction loads two emulated registers of the DPS9000, specifically the accumulator "A" and the supplementary accumulator "Q" registers. The emulated "A" and "Q" registers are both 36-bit registers, and together they are called the "AQ" register which is an emulated 72-bit register with the "A" being the most significant, and the "Q" being least significant. The LOAD64 instruction loads the emulator memory location representing the "Q" register with the "normal" 36-bits of the containing word pointed to by the normal address mechanism as for any typical 36-bit load instruction which includes an operation code and the identification (direct or indirect) of an address in memory. At the same time, the "upper" 28 bits of the 64-bit containing word is copied into the emulator memory location representing the "A" register. Thus, the emulated 36-bit DPS9000 machine "sees" and can examine the 64-bit word in its entirety.

Figure 3A:
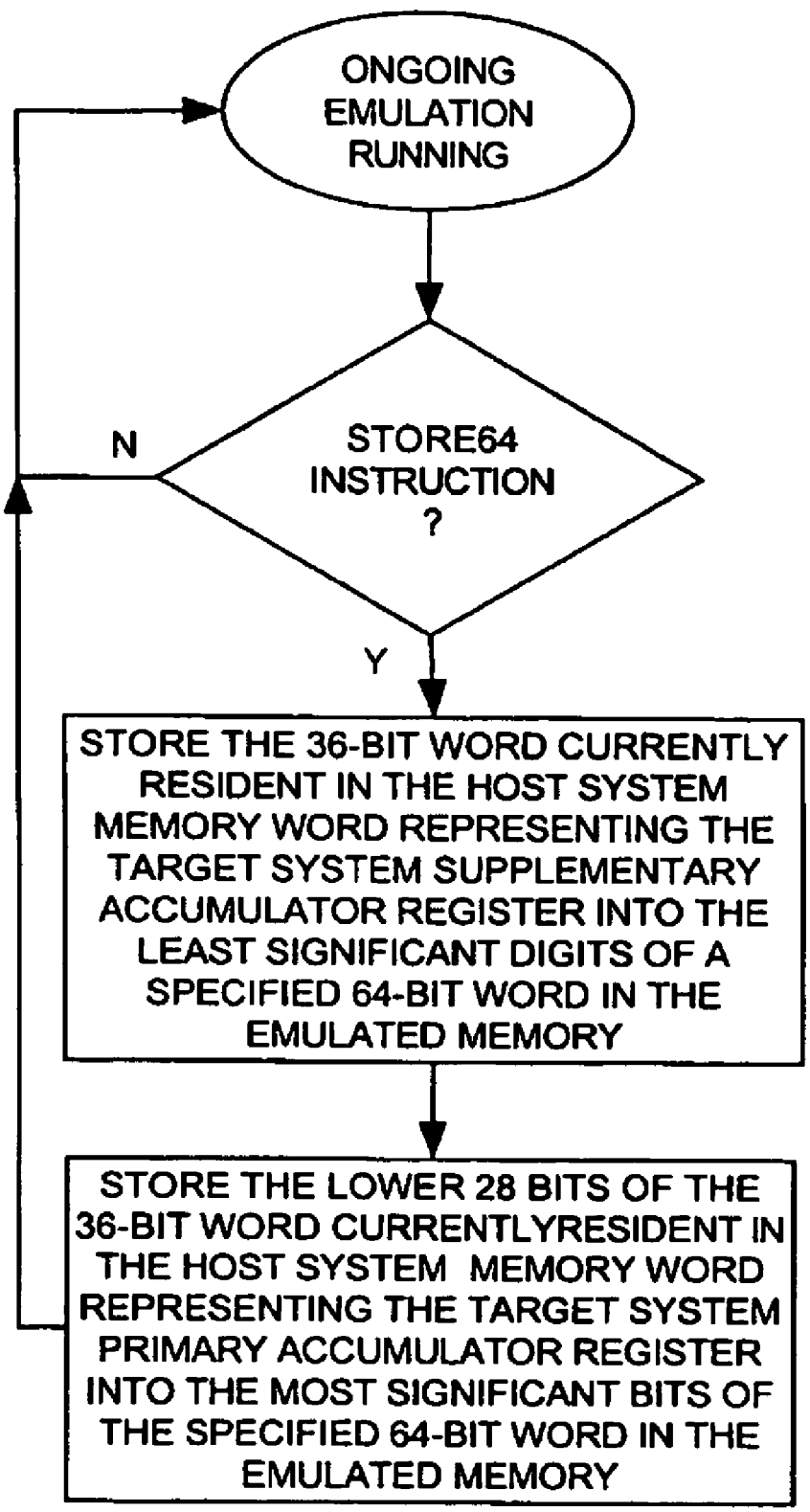
FIG. 3A is a flow chart showing the process of emulating a new read command provided in the operating software of the target system as executed in the host system.
Figure 3B:
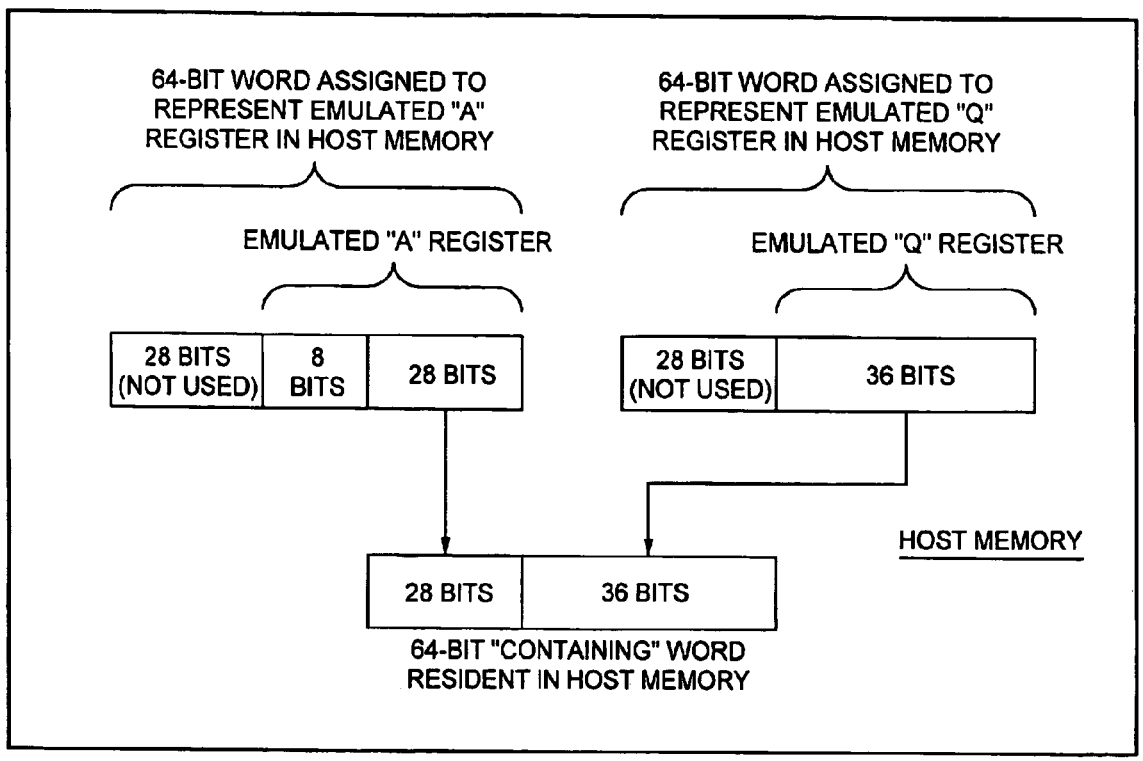
FIG. 3B is a block diagram showing the process flow of FIG. 3A as it takes place in the host system.

Referring now to both FIGS. 3A and 3B, a second new instruction, "Store64", is also provided for purposes of "storing" into the 64-bit containing word from the "normal" 36-bit space of the emulated system. The STORE64 instruction stores the emulated "Q" register contents into the lower 36-bits of the 64-bit containing word, and at the same time stores the lower 28 bits of the emulated "A" register contents into the upper 28 bits of the 64-bit containing word. Address formation for pointing to the 64-bit word is exactly the same as performed for addressing the 36-bit word within the 64-bit containing word.

Thus, the LOAD64 and STORE64 instructions may be utilized to load and store words in 64-bit memory for several purposes. One purpose is for communication between 64-bit programs implementing the emulator. A second purpose is for communication and initialization of 64-bit instructions now provided as part of the emulated instruction set of the DPS9000, with these new instructions serving to increase the performance of the emulation process. A third purpose is for display and debug purposes when a program is being debugged which manipulates data in both the 36-bit and the 64-bit memory space.

Those skilled in the art will understand that the invention is not limited to using the emulated accumulator and supplementary accumulator registers to obtain visibility to the emulated program of the containing word; rather, any suitable pair of general purpose registers in the emulated system may be used for this purpose.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a data processing system in which the structure and operation of a target computer system is emulated by an emulation program on a host computer system and target system memory words, each having a number of bits that are stored within host system memory words, and wherein the number of bits in each of the target system memory words is less than the number of bits in each of the host system memory words, a process for providing target system program accessibility to complete host system memory words which enables newly defined target system functionality comprising the steps of:
    A) storing in host system memory target system words such that each target system word is contained within, but does not fill, a host system word, and
    B) aligning a plurality of target system words within the same plurality of host system words such that there is a region of normally utilized bits for containing each target system word within each of the plurality of host system words, and leaving within each of this plurality of host system words a remaining number of bits, and
    C) in response to a first target system instruction, invoking first newly defined target system functionality specified by the first target system instruction to be provided by the emulation program during emulation of the target system program by:
        1) forming a first address of a first host system memory word, and
        2) providing for reading by the target system program a first content of said first host system word including in the first content all of the bits of the first host system memory word, including those normally utilized and also those remaining bits within the first host system memory word, and
    D) in response to a second target system instruction invoking second newly defined target system functionality specified by the second target system instruction to be provided by the emulation program during emulation of a target system program by,
        1) forming a second address of a second host system memory word, and
        2) providing for writing by the target system program into all bits of the host system memory word including writing into both the normally utilized bits and also the remaining bits of the second host system memory word.

2. In a data processing system in which the structure and operation of a target computer system is emulated by an emulation program on a host computer system and target system memory words, each having a number of bits that are stored within host system memory words, and wherein the number of bits in each of the target system memory words is less than the number of bits in each of the host system memory words, a process for providing target system program accessibility to complete host system memory words comprising the steps of:
    A) storing in host system memory target system words such that each target system word is contained within, but does not fill, a host system word, and
    B) aligning a plurality of target system words within the same plurality of host system words such that there is a region of normally utilized bits for containing each target system word within each of the plurality of host system words, and leaving within each of this plurality of host system words a remaining number of bits, and
    C) in response to a target system instruction invoking newly defined target system functionality specified by the first target system instruction to be provided by the emulation program during emulation of a target system program:
        1) forming an address of a host system memory word, and
        2) providing for reading by the target system program content of the host system word including in the content all the bits of the host system memory word, including those normally utilized and also those remaining bits within the host system memory word.

3. In a data processing system in which the structure and operation of a target computer system is emulated by an emulation program on a host computer system and target system memory words, each having a number of bits that are stored within host system memory words, and wherein the number of bits in each of the target system memory words is less than the number of bits in each of the host system memory words, a process for providing target system program accessibility to complete host system memory words comprising the steps of:
    A) storing in host system memory target system words such that each target system word is contained within, but does not fill, a host system word, and
    B) aligning a plurality of target system words within the same plurality of host system words such that there is a region of normally utilized bits for containing each target system word within each of the plurality of host system words, and leaving within each of this plurality of host system words a remaining number of bits, and
    C) in response to a target system instruction invoking newly defined target system functionality specified by the target system instruction to be provided by the emulation program during emulation of a target system program,
        1) forming an address of a host system memory word, and
        2) provide for writing by the target system program into all bits of the host system memory word, including writing into both the normally utilized and also the remaining bits of the host system memory word.

* * * * *